Oct. 19, 1943.    H. E. NIEBURGS    2,332,107
SURGICAL TOURNIQUET
Filed May 11, 1942
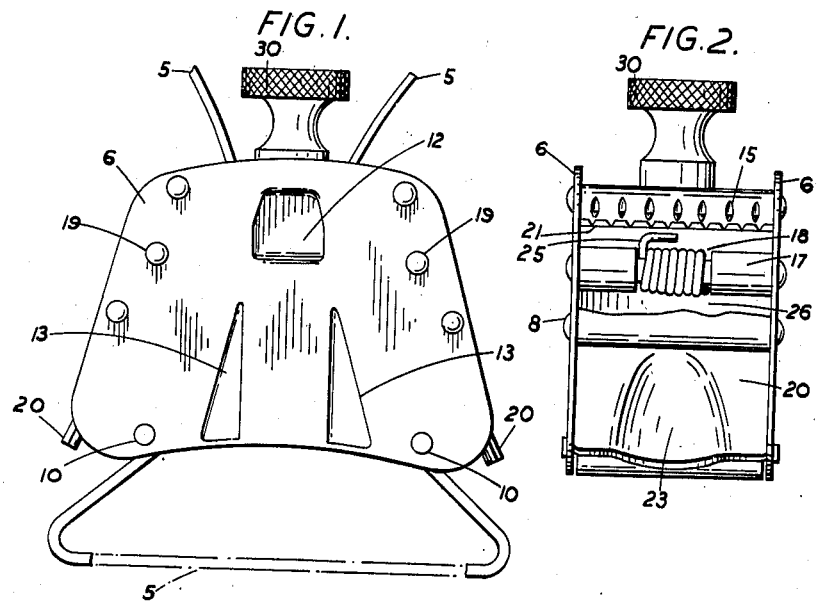
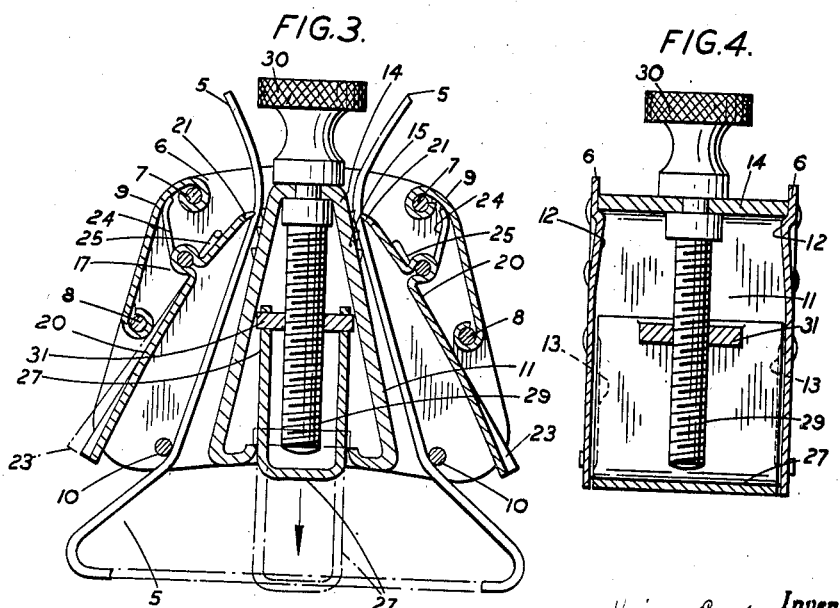

Patented Oct. 19, 1943

2,332,107

UNITED STATES PATENT OFFICE 2,332,107

SURGICAL TOURNIQUET

Haims Eguda Nieburgs, London, England

Application May 11, 1942, Serial No. 442,459
In Great Britain February 27, 1941

2 Claims. (Cl. 128—327)

This invention relates to surgical tourniquets and has for its object to provide such devices which can be readily applied and which moreover are of simple construction.

Surgical tourniquets in accordance with the invention are of the type comprising a loop of elastic material one or both ends of which are adapted for sliding and ratchet grip action with a fitting adapted to be slidden against the ratchet action to lessen the embracing area of the loop and to be held from movement in the other direction.

Generally, in accordance with a feature of the invention, the material from which the elastic loop is formed is comprised by elastic webbing of desired thickness and width and somewhat resembling the elastic webbing as utilised in belts or braces for men's wear.

This webbing is utilised in connection with a clamping fitting which is adapted to engage one end of the loop (the other being anchored) or preferably both ends of the loop.

The sliding fitting is of a one-way nature, that is to say the webbing can be pulled through the clamping fitting in one direction to decrease the size of the loop but unless the clamping means is released, cannot be moved in the other direction. In this way immediately upon applying the tourniquet to a limb, for example, the webbing can be pulled upon either by one or both ends (depending upon the particular nature of the construction) until the necessary tightening is effected, whereupon the loop is held and maintained in this position.

However, releasing means are provided, operable from the exterior of the clamping fitting, to release the grip on one or both ends of the elastic webbing, to enable the loop to be enlarged.

In accordance with a further feature of the invention, there is provided means whereby the direct compression of an artery or arteries can be effected in addition to what may be termed the circular compression due to the general action of the tourniquet.

This direct compression is effected by a member termed a pad or the like carried by a suitable part of the main fitting and subject to screw or other action whereby when the tourniquet is in position it can be moved to give the direct compression action.

In order that the invention may be better understood, it will now be described with reference to the accompanying drawing, which is given by way of example only and in which:

Fig. 1 shows a front elevation of a tourniquet constructed in accordance with the invention, the major part of the tourniquet proper being represented by dot-and-lash lines.

Fig. 2 is a side elevation of Fig. 1 with a certain part hereafter referred to removed.

Fig. 3 is an elevational section through the general central plane of the clamping fitting of the tourniquet, and Fig. 4 is an axial section of the tourniquet fitting of Fig. 1.

In the particular method of carrying the invention into effect, the tourniquet proper is comprised by elastic webbing 5 formed from multi-stranded elastic threads suitably woven to constitute a webbing, single- or multi-ply, of desired thickness and width according to the dimensions of the clamping fitting. Such webbing resembles that of an elastic belt or the webbing as used in braces for trousers. The clamping fitting comprises two parallelly arranged and somewhat kidney-shaped plates 6 spaced apart and made integral by distance posts 7 and 8 (and as hereafter) some of which may also form attaching means for sheet metal and distancing corners members 9. In such a construction, at the corners of what may be regarded as the narrower part of the kidney-shaped plates, they are separated by the corner plates 9 disposed at right angles to the kidney-shaped plates 6 the ends of which corner plates are turned round into sleeves to receive the distance pins or posts by which the plates are spaced apart, but yet riveted together, as shown.

Towards the other corners, which between themselves are more widely separated, other distance posts 10 are disposed the ends of which are riveted over.

Between the kidney-shaped side plates 6 and disposed in a symmetrical manner is arranged an open-ended casing 11 of triangular prismatic form. This is disposed in the plane of symmetry between the plates 6 and is equidistantly arranged between the posts 7, 8 and 10 for securing the corner plates 9 and any other posts which secure the substantially kidney-shaped plates 6 together. This triangular prismatic casing 11 is held in position by shaping the kidney plates. Thus, these side kidney-shaped plates 6 have depressions 12 and 13, the former, as indicated in Fig. 1 and positively shown in Fig. 4, coming beneath the upper narrow member 14 of the open-ended casing 11 and the latter coming within the sloping sides thereof and also forming a registration means for the base portions. These latter also form guides for a removable pad as hereafter referred to.

At its apex 14, which comes adjacent the smaller end of the kidney-shaped plates 6, on the two angularly meeting sides, it is formed or provided with ratchet teeth 15, which may be divided longitudinally. The wider end or base of this triangular prism 11 is spaced apart a desired amount from the posts 10 which help to secure the kidney-shaped plates together at their wider end in such a manner that the elastic webbing 5 can pass between the lateral surfaces of this triangular prismatic member 11 and said posts 10.

Substantially parallel to the angular sides of the prismatic member are arranged two lever plates 20. In an intermediate position each of these plates is bent at 17 in a re-entrant manner and such re-entrant portions have an intermediate notch 18, the re-entrant portions forming bearings to take around pivotal posts 19 secured between the side plates 6. Extending towards the thin edge 14 of the prismatic member 11 these lever plates 20 have arms the faces of which have ratchet teeth 21 co-operating with the ratchet teeth 15 of the prismatic member 11. Extending in a reverse direction, these lever plates 20 have arms or finger pieces which extend laterally from between the kidney-shaped plates 6 towards their wider ends and may have depressions such as 23 to be engaged by the thumbs and/or fingers.

Located around the pivots 19 of these lever plates 20 and with two arms 24 and 25 extending on the one hand to the corner members 9 and on the other hand to the backs of the lever arms at 25 which are serrated, there are arranged coiled springs 26 to keep the said lever arms 20, with teeth 21, pressed towards the teeth 15 of the prismatic member 11.

It will be understood that the arrangement is such that in the particular example described the elastic webbing 5 can, as shown, be threaded through the two sides of the clamping fitting and the two free ends pulled therethrough to lessen the loop and apply the necessary restriction in a manner so obvious as to need no further description.

As will be seen, the wider end of the casing 11 of triangular prismatic form is open-ended, the opening coming on the surface adjacent the limb in action and at its other substantially parallel end has mounted therein in a manner to prevent axial movement but permit rotation, an adjusting screw 29 whose head 30 projects to the exterior.

This adjusting screw 29 engages with a nut 31 carried by a so-called "pad" 27 which has a rectangular section similar to the opening in the triangular prismatic casing.

This pad 27 is formed from bent sheet metal of substantial U section, the ends of the limbs of the U carrying the nut 31 before referred to.

Thus the bend of the U (which is flattened) normally when the pad is in its retracted position forms a part of the surface of the triangular prism (Fig. 1 and full-line position Fig. 3), but when the pad 27 is projected (dotted-line position Fig. 3) this flattened bend of the U forms the actual artery pressure part and may be projected to the extent permitted by the screw engaging parts. For example, such projection may be of the nature of three-quarters of an inch in one form of the device.

As will be realised, the means for gripping and holding the actual tourniquet part 5 can be on the ends of the spring-controlled levers only, or on the surfaces of the triangular prismatic part 11 only, but preferably on both parts. Obviously, the levers are limited to their engaging ends, but these are so shaped as to resemble ratchet teeth and to cause a one-way grip. That is to say, the webbing 5 can be pulled through the clamping device to tighten the tourniquet, but to loosen the tourniquet either one or both levers must be released. Again, the engaging teeth, preferably several rows on the part 11, have an engaging action only in one direction, that is to maintain the clamping action, but readily permit sliding for the purpose of restricting the length of the tourniquet in action.

Although a screw-projected "pad" has been described as moving within the open-ended casing of triangular prismatic form, it will be obvious that such artery compressing pad may be otherwise disposed in the means for carrying and clamping the elastic webbing. Moreover, in place of the screw means for its projection, other means may be adopted. For example, lever means with or without ratchet teeth may be arranged for this purpose.

The invention is not limited to the precise forms or details of construction described herein, as these may be varied to suit particular requirements.

What I claim and desire to secure by Letters Patent of the United States of America is:

1. In a device of the character described, the combination of a frame comprising side plates, means for rigidly spacing the plates in parallel position, a strap formed to a loop outside the frame with ends between the side plates, the side plates being provided with inwardly directed projections, a self-contained assembly between said side plates and locked in position by said projections, the assembly including a casing, a pad, and means for projecting the pad from the casing to selectively determined depth into the loop, and means on the plates cooperating with said assembly for holding the strap against enlargement of the loop.

2. In a device of the character described, the combination of a frame comprising side plates, means for rigidly spacing the plates in parallel position, a strap formed to a loop outside the frame with the ends between the side plates, a self-contained assembly between the side plates and including a casing, a screw supported rotatably by said casing and held against axial movement, a nut on said screw, a pad rigidly connected with the nut and non-rotatably movable between the side plates, whereby upon rotation of the screw, the pad is movable towards and from the casing, and releasable means on the plates cooperating with said assembly for holding the strap against enlargement of the loop.

HAIMS EGUDA NIEBURGS.